US012725116B2

(12) United States Patent
Perich et al.

(10) Patent No.: US 12,725,116 B2
(45) Date of Patent: Sep. 1, 2026

(54) SYSTEM AND METHOD FOR FACILITATING COORDINATION OF TIMELY ORDER FULFILLMENT FOR PERISHABLE ITEMS

(71) Applicant: Target Brands, Inc., Minneapolis, MN (US)

(72) Inventors: David Perich, Minneapolis, MN (US); Ali Obler, Minneapolis, MN (US); Patrick Brinton, Minneapolis, MN (US); Rushabh Sanghvi, Minneapolis, MN (US); Baskar Natarajan, Minneapolis, MN (US); Kristofer Hjelmeland, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 190 days.

(21) Appl. No.: 18/531,011

(22) Filed: Dec. 6, 2023

(65) Prior Publication Data

US 2024/0220923 A1 Jul. 4, 2024

Related U.S. Application Data

(60) Provisional application No. 63/435,641, filed on Dec. 28, 2022.

(51) Int. Cl.

| | |
|---|---|
| ***G06Q 30/06*** | (2023.01) |
| ***G06Q 10/06*** | (2023.01) |
| ***G06Q 10/08*** | (2024.01) |
| ***G06Q 10/087*** | (2023.01) |
| ***H04W 4/02*** | (2018.01) |

(52) U.S. Cl.
CPC .................................. *G06Q 10/087* (2013.01)

(58) Field of Classification Search
CPC .................................................... G06Q 10/087
See application file for complete search history.

(56) References Cited

U.S. PATENT DOCUMENTS

| | | | | |
|---|---|---|---|---|
| 8,756,165 | B1 * | 6/2014 | Haake | G06Q 10/0832 705/332 |
| 10,482,421 | B1 * | 11/2019 | Ducrou | G06V 20/54 |
| 10,846,645 | B2 * | 11/2020 | Smith | G06Q 10/06312 |
| 10,943,289 | B2 * | 3/2021 | Mattingly | G06Q 30/0633 |
| 2002/0152128 | A1 * | 10/2002 | Walch | G06Q 30/0633 705/26.8 |

(Continued)

*Primary Examiner* — Talia F Crawley
(74) *Attorney, Agent, or Firm* — Fish & Richardson P.C.

(57) ABSTRACT

A network based order fulfillment system that tracks capacity of staging facilities for perishable items. As changes to usage of refrigerated storage resources are monitored, changes in the usage of the refrigerated storage resources cause a computing system to communicate with one or more computing devices to update user interfaces on the one or more computing devices to provide users with additional options for fulfilling orders that include perishable items in a timely fashion. Such additional options for fulfilling orders can include options to fulfill the orders at different fulfillment locations that are within a specific travel distance or time of a location associated with the user. Such additional options for fulfilling orders can include options to fulfill the orders at times in the future at which usage of refrigerated storage resources is predicted to be below a threshold value.

19 Claims, 5 Drawing Sheets

(56) References Cited

U.S. PATENT DOCUMENTS

| | | | | |
|---|---|---|---|---|
| 2005/0171827 | A1* | 8/2005 | Denton | G06Q 10/06312 705/7.29 |
| 2015/0227890 | A1* | 8/2015 | Bednarek | G06Q 10/0833 705/26.81 |
| 2015/0254603 | A1* | 9/2015 | Bashkin | G06Q 10/087 312/237 |
| 2017/0024691 | A1* | 1/2017 | O'Brien | G06Q 10/0832 |
| 2017/0024804 | A1* | 1/2017 | Tepfenhart, Jr. | G06Q 30/0635 |
| 2017/0039511 | A1* | 2/2017 | Corona | F25D 29/00 |
| 2017/0146287 | A1* | 5/2017 | Rezayat | F25D 13/00 |
| 2017/0178070 | A1* | 6/2017 | Wang | G06Q 10/0832 |
| 2017/0185928 | A1* | 6/2017 | Zhou | G06Q 10/047 |
| 2018/0130015 | A1* | 5/2018 | Jones | G06Q 10/083 |
| 2018/0260752 | A1* | 9/2018 | Verma | G06Q 10/083 |
| 2019/0026696 | A1* | 1/2019 | Mattingly | G06Q 10/08355 |
| 2019/0242716 | A1* | 8/2019 | N | G01C 21/3469 |
| 2019/0333015 | A1* | 10/2019 | Beasley | G06Q 10/08 |
| 2020/0250737 | A1* | 8/2020 | Wallace | G06Q 30/0639 |
| 2020/0348077 | A1* | 11/2020 | Lee | F25D 29/00 |
| 2021/0004760 | A1* | 1/2021 | Durkee | G06Q 10/06316 |
| 2023/0267404 | A1* | 8/2023 | Villalobos | B65D 88/745 705/332 |
| 2024/0062138 | A1* | 2/2024 | Nelson | G06Q 10/0833 |

* cited by examiner

Customer's Device

Customer's Device

SYSTEM AND METHOD FOR FACILITATING COORDINATION OF TIMELY ORDER FULFILLMENT FOR PERISHABLE ITEMS

CROSS-REFERENCE TO RELATED APPLICATIONS

This application claims the benefit of priority to U.S. Application No. 63/435,641, filed on Dec. 28, 2022, the contents of which are hereby incorporated by reference.

TECHNICAL FIELD

This document generally relates to architecture of computer systems, communications between computing devices, and graphic user interfaces for eliciting user input.

BACKGROUND

Computing devices are devices that accept data input, process the data, and provide data output using hardware and software. Computing devices can communicate with other computing devices using wired or wireless networks or a combination thereof. For example, computing devices can communicate over the Internet. User interactions with a computing device can cause the computing device to transmit communications to a second computing device, which can cause the second computing device to provide output such as changes to a visual display, sounds, or tactile output. Such output at the second computing device can elicit user input from a user of the second computing device which can in turn cause the second computing device to transmit one or more communications to the first computing device thereby causing the first computing device to generate additional output.

SUMMARY

This document generally describes a network based order fulfillment systems that coordinates communications between multiple computing devices and/or computing systems to monitor, in real time or near real time, capacity of staging facilities for perishable items. As changes to usage of staging and/or storage resources are monitored, changes in the usage and capacity of such staging and/or storage resources cause a computing system to communicate with one or more computing devices to update user interfaces on the one or more computing devices to provide users with additional options for fulfilling orders that include perishable items in a timely fashion. Such functionality ensures that orders are fulfilled in a timely manner while preventing the spoilage of perishable items. Various changes of storage capacity status detected by a computing system are used to update interactive applications running on various user devices. Furthermore, user inputs received at those user devices, from interaction between the users and the updated user interfaces executing on those devices, cause updates to user interfaces provided by one or more store employee computing devices. Such automatic detection and updating and communications between these various computing devices and systems facilitates timely fulfillment orders placed by users of various user devices while minimizing or eliminating spoilage of perishable items.

For example, one or more sensors located at a fulfillment location, such as a retail store, can monitor capacity of staging locations or storage locations for holding perishable items. For example, a staging location at the fulfillment location may contain a number of refrigeration units and a number of freezer units, each having one or more compartments or storage areas for storing perishable items. A computing system in communication with the one or more sensors can determine usage of each of the storage areas and use this sensed information to determine if one or more of the refrigeration or freezer units is at or near capacity. The computing system can further determine if refrigeration and/or freezer capacity at the fulfillment location is at or near capacity.

In response to determining that refrigeration and/or freezer capacity for the fulfillment location is at or near capacity, the computing system can communicate with one or more end user devices to update user interfaces presented on those end user devices to provide each user with additional options for navigating an online order placement process and curbside or in-store fulfillment process. For example, an end user device can be executing a dedicated application for a retailer that facilitates placement of online orders and curbside or in-store fulfillment. In this example, the user is currently engaged with the dedicated application to select items for curbside or in-store pickup at the fulfillment location. The computing system can communicate with the end user device to cause one or more user interfaces of the dedicated application to be updated in response to a determination that refrigeration and/or freezer capacity for the fulfillment location is at or near capacity. For example, the dedicated application can provide a notification to the user that the selected fulfillment location is at capacity for perishable items in response to the determination that the refrigeration and/or freezer capacity for the fulfillment location is at or near capacity and a determination that the user has added one or more perishable items requiring refrigeration and/or freezing to their order.

Additionally, in response to determining that the user has added one or more items requiring refrigeration to an order and that the indicated fulfillment location is at or near capacity for a refrigerated staging area, the computing system can communicate with the end user device to cause the dedicated application to update the provided user interface or provide one or more additional user interfaces providing additional options for the user for obtaining the desired perishable items. For example, the user interface can be updated to present the user with options for saving the entire order for a later time or moving only the perishable items to a separate order for fulfillment at a different time. The computing system can access historical usage data to determine times when the refrigeration staging areas are likely to not be at or near capacity and suggest such times as alternative times for fulfilling the entire order or for fulfilling only the perishable items (while placing an order to fulfill the non-perishable items in the original order at the current time).

As another example, the computing system can communicate with one or more computing systems at other fulfillment locations that are still within a reasonable distance (e.g., driving distance, public transportation access, walking access, depending on the geographic location) of the user that have the items in the user's order in stock and have available refrigeration capacity for staging the perishable items in the order. For example, based on a selected preferred transportation method, the system can identify other fulfillment locations with a travel time from the user's current location, home location, or other location associated with the user that are below a threshold travel time value. The computing system can then communicate with the end user device to cause the dedicated application to present a user interface that provides an option to the user to change the fulfillment location of the order to one or more other fulfillment locations within reasonable distance of the user (or of the initial fulfillment location if the location of the user is unknown) for fulfillment at the present time, rather than waiting until a time when there is sufficient refrigeration capacity at the initially desired fulfillment location.

In response to user interaction with the above described user interfaces at the end user device, the computing system can communicate with computing devices at one or more fulfillment locations to provide information on items from the order for preparation for curbside or in-store pickup fulfillment to allow one or more employees at the fulfillment locations to prepare the items for the order(s) for pickup by the user.

As another example, the first user device can receive input from the first user indicating items that the first user wishes to purchase from a store, the first user's progress in traveling to the store, and other information about the first user and the first user's order. The first user's device can provide this information to a user device of a worker at a fulfillment location to allow the worker to fulfill the order in a timely manner and provide the items in the order to the first user upon arrival of the first user at the fulfillment location. The worker can interact with her user device to cause the worker's device to update a status of the order and provide information to the first user's device which can cause the first user's device to provide additional information to the first user.

In one aspect, in general, a computer implemented method includes receiving, by a first computing system, information indicating selection of one or more items for inclusion in an online order initiated by a user at a remote computing device; determining that one or more of the items included in the online order requires refrigeration; receiving, by the first computing system and from a second computing system, information indicative of usage of one or more refrigeration units located at a fulfillment location; identifying, by the first computing system, a usage value for the one or more refrigeration units located at the fulfillment location; determining, by the first computing system, that the usage value satisfies a first usage parameter; in response to determining that one or more of the items included in the online order requires refrigeration and determining that the usage value satisfies the first usage parameter, identifying, by the first computing system, one or more potential alternative fulfillment locations that satisfy a travel parameter; receiving information indicative of usage of one or more refrigeration units located at each of the one or more potential alternative fulfillment locations; determining a set of one or more alternative fulfillment locations from the one or more potential alternative fulfillment locations using the information indicative of usage of the one or more refrigeration units located at each of the one or more potential alternative fulfillment locations to identify that the information indicative of usage of the one or more refrigeration units located at each of the alternative fulfillment locations in the set of alternative fulfillment locations satisfies a second usage parameter; providing, by the computing system and to remote computing device, one or more communications that cause the remote computing device to display one or more alternative fulfillment options, wherein at least one of the one or more alternative fulfillment options includes an indication of at least one of the alternative fulfillment locations in the set of alternative fulfillment locations; receiving information indicating a selection of one of the one or more alternative fulfillment options; and processing the online order in accordance with the selected one of the one or more alternative fulfillment options.

Some implementations can optionally include one or more of the following steps. In some implementations the information indicative of usage of the one or more refrigeration units located at the fulfillment location can include an indication of a number of refrigerated storage units in a staging area of the fulfillment location that are occupied. In some implementations the number of refrigerated storage units in the staging area of the fulfillment location that are occupied can be determined using a plurality of sensing devices. In some implementations the number of refrigerated storage units in the staging area of the fulfillment location that are occupied can be determined using a plurality of employee operated scanning devices.

In some implementations the information indicative of usage of the one or more refrigeration units located at the fulfillment location can include an indication of a percentage of refrigerated storage units in a staging area of the fulfillment location that are occupied. The information indicative of usage of the one or more refrigeration units located at the fulfillment location can include a notification that the one or more refrigeration units are at or near capacity. The one or more alternative fulfillment options can include an option to move the one or more items that require refrigeration in the online order to a saved items list.

In some implementations, the method can further include using historic usage data for the one or more refrigeration units located at the fulfillment location to identify a time period in the future at which usage of the one or more refrigeration units located at the fulfillment location is likely to be below a third usage parameter. In some implementations, the one or more alternative fulfillment options can include an option to fulfill the online order at the fulfillment location during the identified time period in the future.

The systems, devices, program products, and processes described throughout this document can, in some instances, provide one or more of the following advantages. By providing streamlined communications between mobile devices operated by users/customers and employees working at fulfillment locations, an order fulfillment system can reduce the amount of time spent interacting with the mobile devices, thereby reducing power consumption and improving battery life of the computing devices. Additionally, by streamlining communications while providing for computer network based ordering and pick-up facilitation, the computing system can reduce the amount of communications to and from mobile computing devices, thereby reducing bandwidth usage of one or more communications networks and freeing up communications bandwidth for other purposes. Additionally, the unique user interface elements described here can reduce the likelihood of perishable items or other time sensitive items becoming spoiled and having to be discarded, thereby preserving resources and preventing undesirable food waste. The improved communications between computing devices of users/customers and computing devices of employees can ensure that a customer does not travel to multiple locations to receive perishable items for an order, thereby reducing fuel/energy consumption, reducing traffic congestion, and improving user outcomes. Additionally, unique user interface elements at mobile computing devices of both users/customers and employees of fulfillment locations can improve user experience thereby leading to improved outcomes with respect to efficiency and accuracy of both user interactions with the mobile computing devices and fulfillment of orders. Other benefits and advantages will be apparent from the following descriptions.

DESCRIPTION OF DRAWINGS

Like reference symbols in the various drawings indicate like elements.

DETAILED DESCRIPTION

Figure 1:
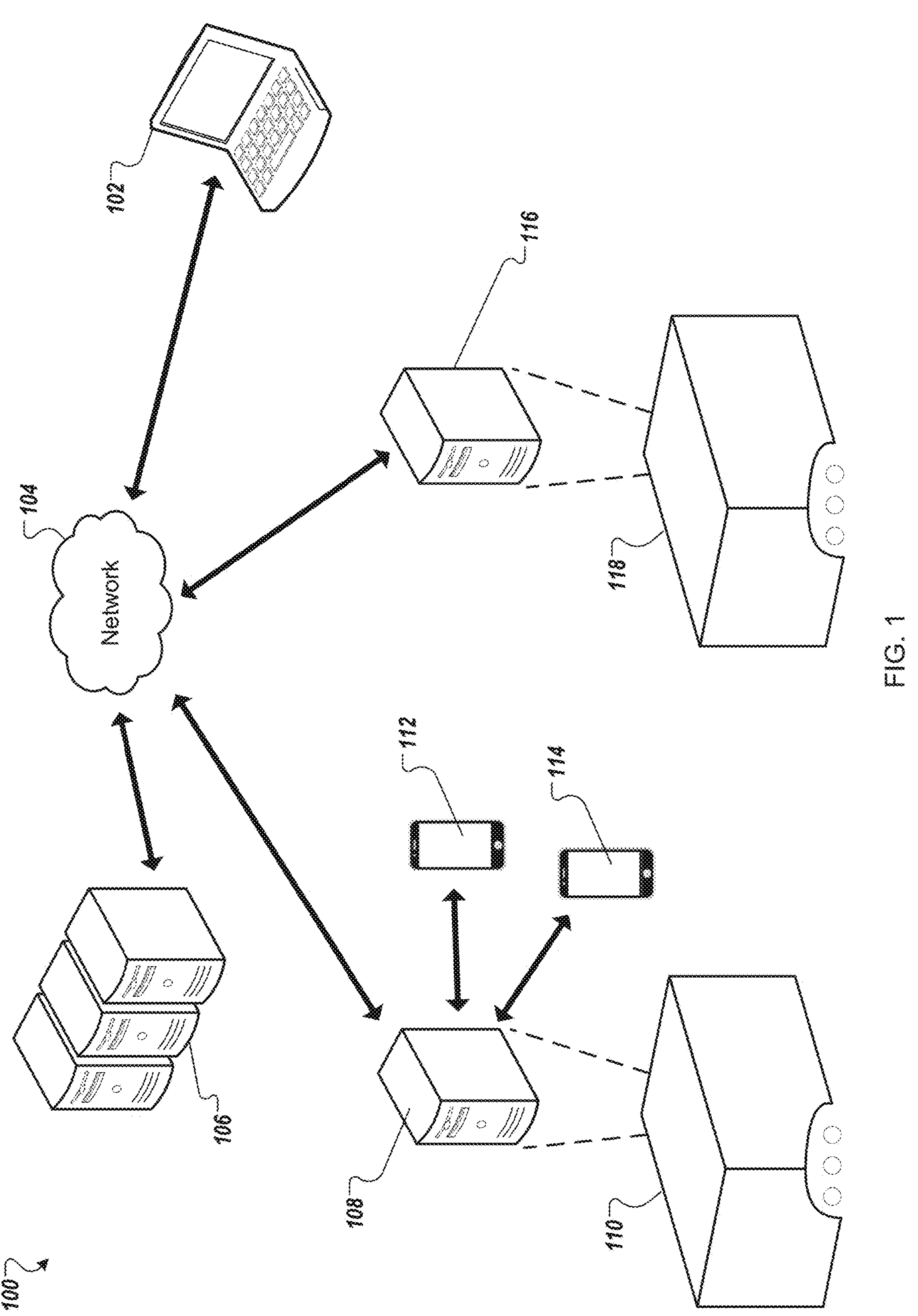
FIG. 1 is diagram of an example system for facilitating drive-up or pickup order fulfillment for orders involving perishable items.

FIG. 1 is a diagram of an example system 100 for facilitating order fulfillment for both drive-up (curbside) and in-store pickup orders (collectively referred to as "pickup orders") that include perishable items that require refrigeration or freezing (collectively referred to as refrigeration herein, except where distinguished below). In the system 100, a user, such as a customer who wishes to complete an online order for items by picking up the items using a drive-up or in-store pickup fulfillment service, can access a dedicated application executing on a computing device 102. The computing device 102 can be, for example, a laptop computer, a mobile phone, a tablet device, a touch screen computer, a desktop computer, a PDA, a smart TV, a smart watch, or other mobile, semi-mobile, or stationary computing device. In some implementations, instead of accessing a dedicated application executing on the computing device 102, the user can use a browser of the computing device 102 to access a website that provides the below described functionality and therefore all descriptions related to use of the dedicated application apply equally to a web-based implementation.

The user logs into the dedicated application by entering a user name or other identifier and a password. Alternatively, the user can log into the dedicated application by providing biometric information using one or more sensors of the computing device 102 such as by scanning a fingerprint using a fingerprint scanner of the computing device 102 or using a retina scanner of the computing device 102 to scan the user's retina information. In some implementations, the user may be already logged into the dedicated application from a previous session.

The user can use the dedicated application to select items for purchase from a store using an online shopping interface. For example, the dedicated application can be a grocery shopping application that can permit the user to search and/or browse for grocery items, add desired items to a virtual shopping cart, and place an order for the selected items by entering payment information. The user can also use the dedicated application to access one or more previously entered orders. For example, a user may have previously logged into an online account for a retailer associated with the dedicated application and placed an on-line order for one or more items using either the computing device 102 or a different computing device such as a mobile phone. As another example, the user may have previously placed an on-line order using the dedicated application. The user can access and review the previously placed orders after logging into the dedicated application. This can include reviewing items included in the orders, estimated time until the order is ready, payment used for the order (e.g., "card ending in 123"), a fulfillment location for the order, notifications regarding items that are unavailable at the indicated fulfillment location, and other information associated with the orders.

The computing device 102 can communicate with other computing devices through a network 104, such as, for example, the Internet. For example, the computing device 102 can communicate with a network access point such as a WiFi router or a cellular communication tower to access the network 104 and communicate with other computing devices. For example, the computing device 102 can communicate with a server system 106 consisting of one or more servers to place the order. Alternatively, or additionally, the user can start the order on a different computer and complete the order using the computing device 102. The server system 106 can be affiliated with a retailer and process the on-line order received from the computing device 102 or another computing device being used by the user of the computing device 102. In one example ordering process, the server system 106 can facilitate fulfillment of the order by providing details of the order, such as ordered items, identity of the user, an order number, time that the order was placed, etc. to a computing system 108 located at a fulfillment center such as a store 110. The computing system 108 can comprise one or more servers, desktop computers, or other computing devices. In some implementations, the computing system 108 is affiliated with the store 110 but not physically located at the store 110.

The store 110 can be, for example, part of a chain of affiliated stores associated with a retailer and the server system 106 can be a server system associated with the retailer. In one example ordering process, upon receiving an on-line order from the user, the server system 106 can identify the store 110 as an appropriate fulfillment location for the order based on one or more factors such as, an indication of a preferred location for fulfillment indicated by the user at the computing device 102 or another computing device, a current location of the computing device 102, another location associated with the user (e.g., home or work address information entered by the user into a customer profile), based on item availability (e.g., by identifying a store where all or a majority of the items in the order are in stock), or based on a combination of these and one or more other factors. In some implementations, the user can indicate the preferred fulfillment location at or near the time of starting the order, prior to adding items to a virtual shopping cart for the order, when completing an order (online checkout) or when creating a profile.

The computing system 108 can communicate with one or more computing devices 112, 114 in the possession of employees of the store 110 to convey information on pickup orders placed by users to allow the employees to gather items for the orders and prepare the orders for drive-up fulfillment or in-store pickup fulfillment. Each of the computing device 112 and the computing device 114 can be a mobile computing device, such as, for example, a mobile phone, a tablet device, a touch screen computer, a laptop computer, a PDA, a smart watch, or other mobile device. In some implementations, the computing device 112 and/or the mobile device 114 can be a non-mobile or semi-mobile device such as a server, a desktop computer, a cash register, a smart TV, or other computing device. The computing system 108 can communicate with the computing devices 112, 114 via a WAN or LAN. For example, the computing system 108 can communicate with the computing devices 112, 114 through the network 104, through a cellular network, through a local WIFI network of the store 110, via Bluetooth communication, or via another suitable communication protocol. In an example order fulfillment process, the server system 106 can provide appropriate information for an order placed by the user of the computing device 102 to the computing device 112 such as items in the order, identifying information for the user who placed the order, time the order was placed, a desired pickup time for the order (e.g., as indicated by the user at the time of placing the order), an order number, and other relevant information.

In some implementations, the user's computing device 102 communicates with the server system 106 throughout the ordering process. For example, as the user searches for items to add to the order, the computing device 102 will send searches, queries, or GUI interactions/selections by the user to the server system 106 which will respond to the computing device 102 with information that allows the computing device 102 to provide further user interfaces via the dedicated application. For example, the user can use a search function of the dedicated application to enter a search query of "apples." The computing device 102 will communicate with the server system 106 through the network 104 to convey the search query to the server system 106. The server system will then return a number of listings for different types of apples (and possibly other listings matching the search term, such as brands of apple sauce and/or apple juice). The dedicated application will then render the listing information received from the server system 106 to present the search results to the user. The user can then select one or more of the displayed items and an item quality to add those items to the user's virtual shopping cart.

As another example, the computing device 102 can communicate with the server system 106 to indicate that the user has initiated a new order process. In response, the server system 106 can access stored historic purchase information for the user to identify items that the user has purchased in previous orders. The server system 106 can provide this information on previously purchased items to the computing device 102 to allow the dedicated application to present the user with a listing of previously purchased items that the user can easily select from to purchase those items again. In some implementations, the listing of previously purchased items is curated by the server system 106 to present items that are more likely to be repurchased on a regular basis such as grocery and toiletry items. For example, users are more likely to repurchase salad greens on a regular basis whereas users are likely to submit repeat orders for toasters.

At the time of placing the order, or at a different time, such as when logging into the dedicated application, the user of the computing device 102 can indicate a desired order fulfillment method for the order. For example, the user can specify that the order is for drive-up fulfillment. A drive-up fulfillment allows the user to drive to a fulfillment location, such as a retail store location, a warehouse, or another location where an employee of the retailer can meet the user at the user's vehicle 104, verify that the user is receiving the proper order, and provide the items to the user without the user being required to exit his vehicle. For example, the user can travel to the store 110, park in a designated area of the parking lot of the store 110, notify an employee that they have arrived (as described in more detail below), and then receive the purchased items from the employee when the employee brings the items to the user's vehicle 104. Alternatively, the user can specify that the order is for in-store pickup fulfillment or for delivery fulfillment.

As the user adds items to the order, the computing device 102 can communicate with the server system 106 to indicate items that are being added to the user's virtual shopping cart by the user prior to the user completing the order (e.g., by selecting a "submit order" control displayed by the dedicated application). The server system 106 can thus keep track of the user's virtual shopping cart in real or near-real time as the user is adding items to the virtual shopping cart for the order. At the same time, the server system 106 can be in communication with the computing system 108 to receive updates on available quantities of items available at the store 110. For example, as items are purchased (both in-store and through online orders for pickup fulfillment) the computing system 108 can keep track of the stock of items available at the store. As items are purchased, the computing system 108 can detect when items have gone out of stock. The computing system 108 can communicate this information on out of stock items to the server system 106 which can use this information to send notifications to the computing device 102 or otherwise communicate with the computing device 102 to change the display of the user interface presented by the dedicated application. For example, if an item is identified as out of stock by the computing system 108, the server system 106 will not include that item in search results for searches submitted by the user of the computing device 102 when the user has indicated the store 110 as the desired fulfillment location. As another example, if a user has added an item to the virtual shopping cart and that item is then reported by the computing system 108 as being out of stock while the user is still preparing the online order, the server system 106 can communicate with the computing device 102 to cause the dedicated application to provide a notification to the user that the item is no longer available. The server system 106 can also remove the item from the user's virtual shopping cart.

The computing system 108 can also be configured to monitor the status of staging areas for pickup orders at the store 110. For example, when a user places an online order for pickup fulfillment (either drive-up or in-store pickup), one or more employees of the store 110 will begin to gather items for the order as the user's estimated time of arrival ("ETA") approaches. For example, the server system 106 or the computing system 108 can estimate an amount of time required to prepare a particular order based on the number of items in the order or the location of the items in the store. Based on this estimated time for preparing the order and the ETA of the customer, the computing system 108 can communicate with the computing device 112 to notify the employee when to begin preparing the customer's order. Upon receiving the notification at the computing device 112, the employee can begin gathering items for the order. This can include bagging the items for the order and placing the bagged items for the order into one or more designated storage units within a staging area of the store 110. Such storage units can take the form of shelves, cubbies, areas of a counter, drawers, hooks, etc. In instances in which the order includes perishable items (e.g., items requiring refrigeration and/or freezing), the storage units at the staging area can include shelves, drawers, or other designated areas within refrigerators and freezers located at the staging area. Such refrigerator and freezer storage units in the staging area are collectively referred to as refrigeration storage units below, except where distinguished.

The computing system 108 can keep track of utilization of each of the storage units in the staging area. For example, as employees place bags containing items for pickup orders in/on storage units, the employees can use the computing devices 112, 114 to indicate where the bag has been placed so that the same employee or another employee can easily retrieve the bag when the customer arrives to pick up the order. For example, the employee can interact with a user interface of the computing device 112 to enter a storage unit location number for a bag when placing the bag on/in the storage unit. For example, the employee can place a bag for an item on shelf "A4." The employee can then access the order associated with the bag using the computing device 112 and type "A4" into a field provided by a user interface of the computing device 112 to indicate that the bag has been placed on shelf A4. The computing device 112 can then communicate with the computing system 108 to indicate that the bag has been placed on shelf A4. For example, the computing device 112 can send communications to the computing system 108 indicating an order number, the items for the order contained within the bag, and the storage unit location A4. The computing system 108 can store this information to provide to the same employee or another employee when the customer arrives to the pick up the order so that one or more bags for the order can be easily retrieved and provided to the user.

As another example, an employee can use the computing device 112 to scan a sticker or tag containing a computer readable code (e.g., bar code, QR code, alphanumeric code) on the bag and also scan a sticker or tag containing a computer readable code affixed on or near the storage unit to quickly associate the bag with the storage unit where the employee has placed the bag. For example, an employee can use the computing device 112 to scan a computer readable code on a bag containing perishable items and then scan a computer readable code in a refrigerator drawer RF7 before placing the bag in the drawer to indicate that the perishable items are staged in refrigerator drawer RF7. As another example, the employee can use a scanning device connected to or in communication with the computing device 112 or the computing system 108 to scan the stickers/tags of the bag and the storage unit to associate the bag with the storage unit location.

In some implementations, some or all of the storage units can include sensors for detecting when a bag or item has been placed in or on the storage unit. For example, each shelf within a refrigerator at the staging area can include a scanner that can scan a computer readable code affixed to the bag to associate the bag (and the items within the bag) with that particular shelf within the refrigerator. The employee can use the scanner to scan the computer readable code a first time to associate the bag with the shelf (i.e., "check in" the bag to the staging location) and then scan the computer readable code a second time when removing the bag from the shelf to "check out" the bag and deliver it to the customer's vehicle. When a bag is checked into a particular storage unit location, the scanner can communicate with the computing system 108 (either directly or indirectly) to indicate that the bag is located at that storage unit. Similarly, the scanner can communicate with the computing system 108 when the bag is checked out from the storage unit location. As another example, each storage unit can include an RFID reader for reading RFID tags associated with bags or items to determine when a bag/item has been placed in the particular storage unit and report this information to the computing system 108.

In some implementations, all or a portion of the storage units can include sensors for sensing when a bag containing one or more items has been placed upon/within the storage unit. In such implementations, such sensors can be used by the computing system 108 to determine if a particular storage unit is occupied or available without necessarily keeping of which items are positioned within a particular storage unit or if a particular storage unit is associated with items for a particular order. For example, one or more storage units can include a weight sensor for sensing when one or more bags containing one or more items has been placed upon/within the storage unit. As another example, one or more storage units can include a camera, infrared sensor, or other light sensitive sensor for sensing when one or more bags containing one or more items has been placed upon/within the storage unit. In another example, the above described RFID reader for reading RFID tags associated with bags or items can be used to detect when a storage unit is occupied.

The above described techniques, either alone or in combination, can be used to determine current usage of each storage unit, including refrigerated storage units, in the staging area of the store 110 is currently in use for a placed order. The computing system 108 can use information gathered using the above described scanning, manual entry, and/or sensing techniques to determine an occupied or available status for each storage unit. The computing system 108 can also associate a storage unit type (e.g., refrigerated, freezer, over-sized, standard, etc.) for each storage unit with a current occupied or available status for that storage unit. Collecting this information by the computing system 108 can allow the computing system 108 (or the server system 106) to determine a current occupancy level for storage units in the staging area of the store 110. For example, the computing system 108 (or server system 106) can use the collected information on the occupied or available status of each storage unit to determine the overall current usage rate of all refrigerated storage units (e.g., 77% capacity for refrigeration storage units) or the overall current usage rate of all freezer storage units (e.g., 58% capacity for freezer storage units). The server system 106 can also collect such storage unit utilization information over time to determine statistics on particular times of day and days of the week at which storage units are utilized at particular utilization levels and track such historical data to make predictions about future utilization of the storage units in the staging area at the store 110. The server system 106 or computing system 108 can then provide information to employees using the computing devices 112 and 114 or to customers such as the user of computing device 102 regarding pending orders or in-process orders that are not yet placed based on storage unit occupancy rates.

In some cases, when the overall storage unit capacity, or the capacity for a specific category of storage units is above a threshold value, the server system 106 or computing system 108 can provide notifications to employees or customers and direct usage of the system in different manners based on the occupied status of storage units exceeding the threshold. For example, if refrigerated storage unit occupied designation meets or exceeds 90% of the refrigeration capacity for the staging area for the store 110, the server system 106 can prevent customers from placing new orders that include refrigerated items for pickup fulfilment at the store 110 and instead direct such customers to other possible alternative fulfilment options. Preventing users from placing new orders for pickup fulfillment that include refrigerated items when the occupancy level of the refrigerated storage units in the staging area of the store 110 can prevent perishable items from spoiling due to unavailability of refrigerated storage units in the staging area. Over time, the server system 106 can adjust the threshold, based on historically tracked data, to determine an optimal threshold that allows for the most number of orders that include refrigerated items to be placed while preventing spoilage of perishable items. In some implementations, the server system 106 can set a first threshold for occupancy level of refrigerated storage units for a store and a second occupancy level for frozen storage units for the store. In some implementations, the server system 106 sets different thresholds for different stores depending on the total refrigerated and/or frozen capacity of the staging area of the store.

In an example, the computing system 108 uses the above described techniques to determine that 92% of refrigerated storage units in the staging area of the store 110 are currently occupied with one or more items for customer orders. The computing system 108 reports this information to the server system 106. The server system 106 determines that the current 92% occupied level is at or above predesignated threshold of 90%. In this example, the user of the computing device 102 is placing an order using the computing device 102 including items requiring refrigeration and has indicated the store 110 as the fulfilment location for the order. The server system 106 can communicate with the computing device 102 through the network 104 to cause the computing device 102 to display one or more messages to the user of the computing device 102 indicating that the store 110 is not currently available for pickup orders having items requiring refrigeration (based on the determination by the system that the current occupied level of the storage units in the staging area of the store 110 exceeds the predesignated threshold).

The messages provided to the user of the computing device 102 via the interface of the computing device 102 can include one or more options for placing and fulfilling the order other than immediate pickup fulfilment at the store 110. For example, in some implementations, the server system 106 can cause the computing device 102 to provide an option for fulfilling the order at one or more other locations. For example, the server system 106 can identify one or more stores that are within a threshold travel distance or threshold travel time from a location associated with the user, such as the user's current location (if the user has granted permission to share location information for the computing device 102 with the server system 106), the user's home address, the user's preferred shipping address, or the user's work address. As another example, the server system 106 can identify one or more stores that are within a threshold travel distance or threshold travel time of the location of the store 110 (e.g., if the location of the user is unknown). The threshold travel distance or threshold travel time can be set by the server system 106 based on a particular geographic location or region (e.g., depending on the relative density of available stores in the area and general traffic trends in the area).

In a specific example, the server system can identify that a store 118 is within a threshold travel time of the current location of the user (e.g., 20 minutes). The server system 106 can then communicate with a computing system 116 located at or associated with the store 118 to determine if the items in the user's order are available at the store 118 and if there is sufficient refrigerated storage capacity in the staging area of the store 118 (e.g., below the 90% occupancy threshold). For example, the server system 106 communicates with the computing system 116 to query the computing system 116 to determine that the items in the user's order are currently in stock at the store 118. This can, for example, include accessing a database maintained by or associated with the computing system 116 that includes current information on the availability of items at the store 118. The server system 106 or computing system 116 can compare the items in the user's order to information in the database to determine if the items are in stock at the store 118. The server system 106 can also query the computing system 116 to identify the current occupied or available status of the refrigerated storage units in the staging area of the store 118.

If the occupancy level of the refrigerated storage units is below the predetermined threshold, the server system 106 can provide a message or notification to the user via the computing device 102 giving the user an option to select the store 118 for immediate fulfilment. In this example, the server system 106 can identify one or more additional stores within the threshold travel distance or time of the user and perform similar queries as those described above to determine if these additional store locations also have the items in the user's order and refrigeration storage unit staging area capacity below the predetermined threshold. If so, these additional store locations are also presented to the user via the user interface of the computing device 102 as fulfillment options for the user. The user can select one of the store locations for pickup fulfillment of the order and travel to that store location to pick up the order (e.g., using drive-up fulfillment or in-store pickup fulfillment).

In another example, the server system 106 can use historically tracked data regarding occupied status percentage of refrigerated storage units in the staging area of the store 110 to identify alternative times on one or more days at which the server system 106 predicts that the refrigerated storage units in the staging area of the store 110 are likely to have an occupancy level that is below the predetermined threshold. For example, the server system 106 can compare historically tracked data on occupancy levels for the refrigerated storage units in the staging area of the store 110 to identify times of day for each day of the week that the refrigerated storage units in the staging area of the store 110 have an occupancy level less than a second percentage. For example, times at which the occupancy level of the refrigerated storage units in the staging area of the store 110 is below 60% on average are likely to have available storage capacity for those refrigerated storage units at the same times on those days of the week going forward.

The server system 106 can use this historical information and second threshold comparison to identify one or more time periods on that day or later days that week at which there is likely to be available storage capacity for the refrigerated storage units in the staging area of the store 110. The server system 106 can then communicate with the computing device 102 to present the one or more identified time periods as options for later pickup fulfillment at the store 110. In some implementations, these options for later pickup fulfillment time periods at the store 110 are presented along additional options for fulfilling the order sooner at other store locations, such as the store 118 to provide the user with as much flexibility as possible.

In another example, in place of or addition to the above alternative fulfillment options, the server system 106 can communicate with the computing device 102 to offer the user an option for delivery fulfillment of the order. In yet another example, in place of or addition to the above alternative fulfillment options, the server system 106 can communicate with the computing device 102 to offer the user an option to remove the items requiring refrigeration from the order to allow the user to order and pick up the non-perishable items from the store 110 without having to wait for refrigerated storage units of the staging area of store 110 to become available. In some implementations, the server system 106 can offer the user one or more fulfillment options that make up a combination of the above described options. For example, the server system 106 can offer the user an option to split up the order into two or more fulfillment groups for different items. For example, the server system 106 can communicate with the computing device 102 to present the user with an option to pick up non-refrigerated items in the order at the store 110 now while offering one or more later time periods at which the user can pick up the items requiring refrigeration in the order. As another example, the server system 106 can communicate with the computing device 102 to present the user with an option to pick up the non-refrigerated items in the order at the store 110 now and to cancel the refrigerated items from the order (e.g., in a situation in which a large order has a small number (e.g., below a threshold of six) refrigerated items).

As another example, the server system 106 can determine that the store 118 has available refrigerated storage units in the staging area and has all of the refrigerated items in the order but not all of the non-refrigerated items. The server system 106 can communicate with the computing device 102 to present the user with an option to pick up the refrigerated items at the store 118 and to pick up the non-refrigerated items at the store 110. In yet another example, the server system 106 can communicate with the computing device 102 to present the user with an option to pick up some of the items in the order at the store 118 and some of the items in the order at a different store location (other than the store 110 and the store 118). In yet another example, the server system 106 can communicate with the computing device 102 to present the user with an option to pick up some of the items in the order at the store 110 or the store 118 and have other items in the order delivered.

As orders are picked up at the store 110, the computing system 108 receives updated information on the occupied or available status of storage units in the staging area of the store 110. The computing system 108 can convey this updated information on the occupancy level of the storage units in the staging area of the store 110 to server system 106. The server system 106 can determine when the occupancy level of the refrigerated and/or frozen storage units at the staging area of the store 110 are below the threshold level (e.g., below 90% occupied). In some implementations, upon making such a determination, the server system 106 will cease providing alternative fulfillment options (such as those described above) to users placing new orders for pickup fulfillment. In other words, upon determining that the occupancy level of the refrigerated and/or frozen storage units at the staging area of the store 110 are below the threshold, the server system 106 will allow users to place new orders that include refrigerated and/or frozen items for pickup fulfillment at the store 110.

In some cases, when the user has indicated drive-up or in-store pickup type order fulfillment, the dedicated application can provide navigation directions, such as driving directions, to the fulfillment location (e.g., store 110 or store 118). For example, the dedicated application can communicate with a native routing application installed on the computing device 102 or with one or more remote routing servers to identify a route from either the user's current location or a specified starting location to the store 110 or the store 118. As another example, the computing device 102 can communicate with the server system 106 through the network 104 to receive routing information from either the user's current location or the specified starting location to the store 110 or store 118. The dedicated application can then, for example, provide a map display 108 showing a route to the store 110 or the store 118. As another example, the dedicated application can provide turn by turn directions to the store 110 or the store 118 using text and/or icons in addition to or in place of the map display 108.

In some implementations, the user can permit the dedicated application to access location information for the computing device 102. For example, the user can set a permissions setting permitting the dedicated application to access location information for the computing device 102. In some implementations, the user can specify that the dedicated application is only permitted to access location information for the computing device 102 when the dedicated application is executing or can specify that the dedicated application is always permitted to access location information for the computing device 102 even when a user interface for the dedicated application is not open. The computing device 102 can determine its own location using one or more well-known techniques, such as by using a GPS module for receiving GPS signals from GPS satellites to determine the location of the computing device 102. The computing device 102 can also use a wireless communication triangulation technique to determine the location of the computing device 102. As another example, the computing device 102 can determine its location based on the location of a network access point that the computing device 102 is in short range wireless communication with (e.g., a WiFi router). The dedicated application can use the location information to identify a starting location, such as the current location of the computing device 102, for determining a route to the fulfillment location selected by the user (e.g., the alternative fulfillment location, store 118, because refrigerated staging area capacity of the store 110 is above the threshold). In some implementations, location information determined by the computing device 102 is used to determine that the computing device 102 has begun to travel along the route to the fulfillment location. Alternatively or additionally, the user can select a user interface control 112 provided by the dedicated application to indicate that he has begun traveling toward the store 110.

Upon determining that the user has begun to travel toward the selected fulfillment location, the computing device 102 can communicate with one or more computing devices located at and affiliated with the fulfillment location, either directly through the network 104 or by communicating with the server system 106 which in turn communicates appropriate information and instructions to the one or more computing devices located at the fulfillment location. For example, an employee of the store 110 can use the computing device 112, which can receive information relevant to the order from the server system 106. The computing device 102 can communicate with the server system 106 over the network 104 to indicate to the server system 106 that the user has begun to travel toward the store 110. The server system 106 can then provide a communication to the computing device 112 of the store employee to indicate that the user of the computing device 102 is on the way. The server system 112 may communicate directly with the computing device 112 through the network 104 or may communicate with a computing device/system located at the store 110 which then communicates with the computing device 112, e.g., through a wireless or wired local area network (LAN). In some implementations, the server system 106 or a central computing device located at the store 110 can communicate with the computing device 112 and one or more other computing devices in possession of other employees of the store 110 to allow multiple employees to receive information on on-line orders placed by customers and coordinate efforts to fulfill such orders.

The server system 106 can provide additional information along with this notification or prior to sending the notification that the user is on the way. For example, the server system 106 can access user profile information to identify a make and model for the user's vehicle, a color for the user's vehicle, and/or other identifying information for the user's vehicle 104 (such as a whole or partial license plate number) and provide this vehicle identification information to the computing device 112 to allow the employee to more easily identify the user's vehicle when the user has arrived at the designated drive-up fulfillment location at the store 110. The server system 106 can store this vehicle identification information as part of a customer profile for the user or the user can provide the information at the time of placing the order (e.g., in situations where the user is part of a multi-car family and may use different vehicles on different occasions). In some implementations, the server system 106 can store information on multiple vehicles in association with the user's profile. The user can be prompted to select which pre-stored vehicle that they will be using for a particular order pickup, for example, at the time of placing the order or at the time that user indicates that they are on their way to pick up the order.

The server system 106 can also provide information on an estimated time of arrival and/or an estimated time until arrival for the user for an order pick up. For example, the computing device 102 can calculate an estimated time until arrival for the user based on the estimated time for traversing a route from the user's location to the store 118 and provide this information to the server system 106 which can then provide the estimated time until arrival information to a computing device being used by an employee of the store 118. As another example, the server system 106 can receive location information from the computing device 102 and use this location information to calculate an estimated time until arrival for the user at the store 118. For example, the user can give the dedicated application permission to access location information for the computing device 102. A GPS unit or other location detection unit of the computing device 102 can regularly determine the location for the computing device 102. At the time of indicating to the server system 106 that the user has begun to travel along the route to the store 118, the computing device 102 can also indicate the current location of the computing device 102. The server system 106 can then use either an internal time estimation routine, or communicate with an external routing system to identify an estimated time required for the user to travel from the current location of the computing device 102 to the store 118 using any one of many known techniques. The server system 106 can then provide this estimated time until arrival information to a computing device of an employee at the store 118, which then presents this information to the employee. The provided estimated time until arrival can be periodically updated by the server system 106 as the user travels along the route toward the store 118.

Figure 2A:
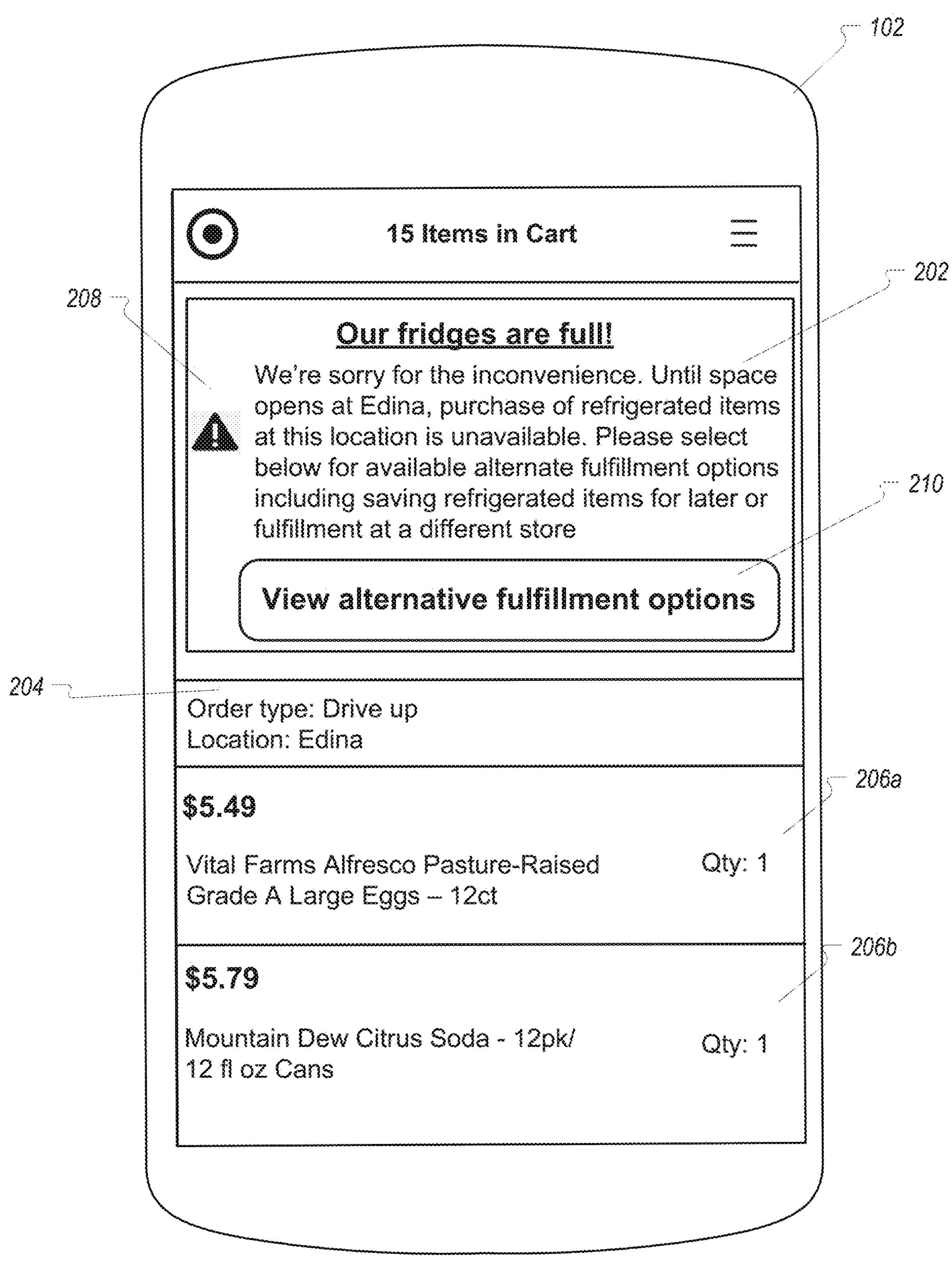
FIGS. 2A-2B show example user interface displays for allowing a user to select an alternate fulfillment option.

FIG. 2A shows an example user interface 202 of the computing device 102 to facilitate selection of an alternate fulfillment option by a user of the computing device 102. The user interface 202 includes a field 204 showing details on the order including the order fulfillment type ("Drive up") and the currently selected fulfillment location for the order ("Edina"). The user interface 202 further includes item listings 206*a* and 206*b*. In some implementations, the user can scroll down (e.g., but dragging a finger on a touchscreen interface of the computing device 102) to view additional items for the order.

The user interface 202 further includes a notification 208 informing the user of the computing device 102 that there is currently not refrigerated item storage capacity available for pickup orders at the selected fulfillment location ("Edina"). The notification instructs the user to select a user selectable control 210 to view available alternate fulfillment options for the order including saving refrigerated items for later or fulfilling the order at a different location. In some implementations, the notification 208 is presented by the computing device 102 in response to receiving one or more communications from a computing system associated with a retailer at which the order is being purchased. For example, the server system 106 of FIG. 1 can make a determination that refrigerated storage capacity usage in the staging area of the store 110 is at or greater than 90% full. In response, the server system 106 communicates with the computing device 102 to cause the computing device 102 to display the notification 208 that includes the user selectable control 210.

The server system 106 can use one or more techniques to determine if there is sufficient capacity for a particular order in the refrigerated storage units of the staging area of the store 110, including using varying thresholds for determining if there is sufficient capacity. For example, a determination as to if there is sufficient capacity in the refrigerated units of a storage area of a given store can be based on total volume available for storage in the refrigerated units in comparison to the volume of refrigerated items for orders that are currently located within the refrigerated units plus volume of refrigerated items for orders that have been placed for that store but have not yet been selected from main refrigeration units and placed in the staging area refrigeration units.

For example, the server system 106 or another computing system can store information indicating the total volume of refrigeration units in the staging area of a particular store. The computing system can further track pickup and drive-up fulfillment orders that have been placed but not yet picked up to identify items requiring refrigeration in those orders. The computing system can then access a database containing information on the volume of items requiring refrigeration in those orders. This can include items in orders that have already been placed in the refrigeration units at the staging area and items in orders that have been placed but for which the refrigerated items have not yet been placed in the refrigeration units at the staging area. The computing system can then compare the total volume of all items requiring refrigeration for all pickup and drive-up orders that have been placed but not yet fulfilled at the given store location to the total refrigeration capacity at the staging area of the store to determine if the refrigeration capacity of the storage area has exceeded a preset threshold. For example, the computing system can divide the total volume of all items requiring refrigeration for all pickup and drive-up orders that have been placed but not yet fulfilled at the given store location by the total volume of the refrigeration capacity of the staging area to determine the percentage of the refrigeration capacity that is being used. The computing system can then compare that percentage to a threshold value to determine if there is sufficient capacity for additional items requiring refrigeration or if orders containing items requiring refrigeration should be redirected to other times and/or locations. For example, the threshold can be 90%. In additional examples, the threshold can be 85%, 87%, 92%, or 95%. In some embodiments, if the total volume of all items requiring refrigeration for all pickup and drive-up orders that have been placed but not yet fulfilled at the given store location divided by the total volume of the refrigeration capacity of the staging area exceeds the threshold value, the computing system can identify the refrigerated storage capacity for the staging area of that store as being full.

In some implementations, the determination as to if there is sufficient refrigerated storage capacity is made on a refrigerator by refrigerator basis, on a storage area by storage area basis, on a shelf by shelf basis, etc. rather than based on the total storage capacity of all refrigerated units in the store. The total storage volume of each individual refrigerator, storage area, or shelf can be compared to the volume of the items stored in that location or identified as to-be-stored in that location to make individual determinations for each refrigerator, storage area, or shelf as to if it is full. In such scenarios, when each location is identified as full, future orders are diverted until additional refrigerated storage space becomes available at the staging area.

Items can be identified as being removed from the refrigerated storage at the staging area when an order containing those items is completed (e.g., the system has identified that the customer has picked up the order) or at the time that the items are removed from the refrigeration units (e.g., an employee has scanned the items out of the staging area for delivery to the customer in the store or at their vehicle). In some implementations, the currently used storage capacity is compared to the total storage capacity and then compared to the threshold for total storage capacity usage each time items are removed from the refrigeration units at the staging area and each time a new order containing items that require refrigeration is placed for that store. In other words, the available storage capacity is recalculated by the computing system each time there is a change in the amount of refrigeration storage capacity in the staging area, such as when an order containing refrigerated items is fulfilled or when additional items for new orders are identified as requiring refrigeration space in the staging area.

In some implementations, a secondary check of the volume of items requiring refrigeration in the staging area is made at the time that items are physically placed in the refrigeration units in the staging area. Such a secondary check can account for differences in the calculated volume of items requiring refrigeration in the order at the time the order is placed and the actual volume of items requiring refrigeration for the items actually included in the fulfilled order. For example, one or more items requiring refrigeration may not be available for a given order due to inconsistencies between the computing systems identified inventory for the store and the actual available inventory for the store. For example, an item identified as being in stock by the computing system may be in fact not actually in stock, or may be damaged, spoiled, or otherwise unavailable for sale to the customer. The customer can be refunded for such items as they are not included in the fulfilled order. During the secondary check at the time of placing items into the refrigeration units at the staging area, the computing system can determine the total volume of items actually being added to the staging area refrigeration units (e.g., when an employee scans in such items) that reflects the actual items that are available for fulfillment of the order. The available capacity of the refrigeration units at the staging are can then be recalculated to reflect the true available capacity based on the updated information available to the computing system.

As another example, a variation on an item may be available that has a different volume than that included in the customer's order (e.g., a six pack of popsicles is unavailable but an eight pack of popsicles having a larger volume is available). The secondary check at the time of placing items into the refrigeration units at the staging area allows the computing system to identify that additional storage volume is unavailable compared to the original calculation for the order at the time that the order was placed. Other discrepancies between the volume of items requiring refrigeration in the order as placed and the volume of items requiring refrigeration in the order as fulfilled can also occur and be accounted for through the secondary check conducted by the computing system at the time that the items requiring refrigeration are added to the refrigeration units of the staging area.

In some implementations, the computing system can subtract a set amount of volume from the actual storage volume of the refrigeration units in the staging area to account for the space needed to place items in and retrieve items from the refrigeration units (e.g., space required for employees to reach into the refrigeration units to handle refrigerated items in the refrigeration units). This subtraction of the marginal volume needed to handle refrigerated items can occur before the total volume of items requiring refrigeration in the staging area is compared to the total available refrigeration volume of the refrigeration units in the staging area.

Figure 2B:
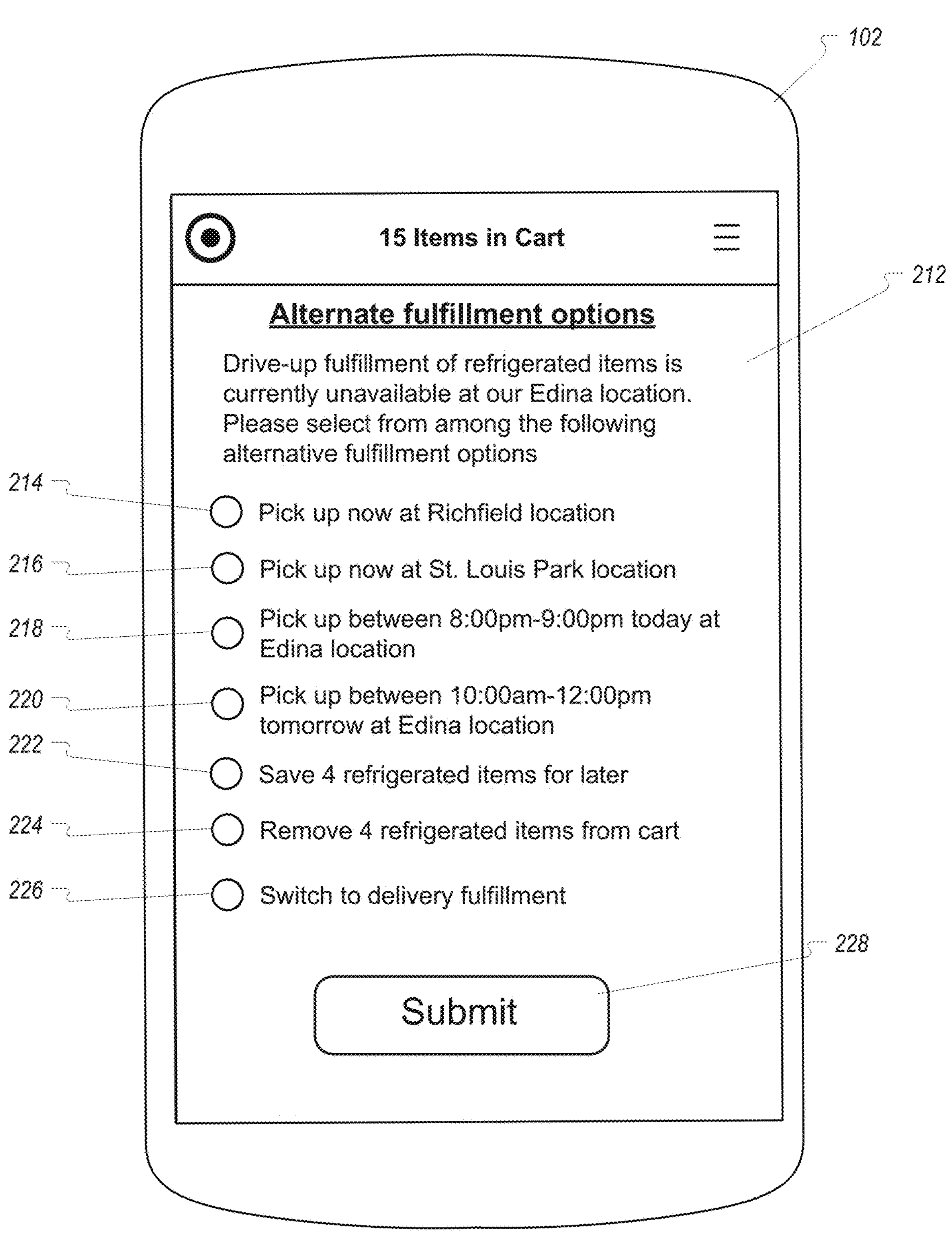

Continuing with the example depicted in FIG. 2A, selection of the user selectable control 210 of FIG. 2A can cause the user interface 202 of the computing device 102 to display a screen 212, depicted in FIG. 2B, with available alternate fulfillment options for the order. The screen 212 informs the user that drive-up fulfillment of refrigerated items is currently unavailable at the originally selected fulfillment location ("Edina") and presents the alternate fulfillment options. The available options include respective user selectable controls, such as radio buttons, that allow the user to select an alternative available option for the order.

Selection of an option 214 allows the user to fulfill the order by picking up the order at the Richfield location of the retailer. For example, the sever system 106 of FIG. 1 can determine that the Richfield location is within a threshold distance or travel time of a current location or home location of the user. The server system 106 can then determine that the Richfield location has all items for the order in stock and also has sufficient available refrigeration storage capacity in the staging area of the store. The server system 106 can then communicate with the computing device 102 to make the option 214 available to the user based on the determination that the Richfield location is within the threshold travel parameter, has all items for the order in stock, and also has available refrigeration storage capacity in the staging area of the store.

Returning to FIG. 2B, selection of an option 216 allows the user to fulfill the order by picking up the order at the St. Louis Park location of the retailer. For example, the sever system 106 of FIG. 1 can determine that the St. Louis Park location is within a threshold distance or travel time of a current location or home location of the user. The server system 106 can then determine that the St. Louis Park location has all items for the order in stock and also has available refrigeration storage capacity in the staging area of the store. The server system 106 can then communicate with the computing device 102 to make the option 216 available to the user based on the determination that the St. Louis Park location is within the threshold travel parameter, has all items for the order in stock, and also has available refrigeration storage capacity in the staging area of the store.

Selection of an option 218 or an option 220 allows the user to keep the original selected fulfillment location of Edina while changing a pickup window to a later time. For example, the server system 106 can access recorded historical data on usage of refrigeration units in the staging area of the Edina location to identify times in the future that are likely to have available refrigeration storage capacity in the staging area of the Edina location. In this example, the server system 106 has identified that the staging area of the Edina location is likely to have available refrigeration storage capacity between 8:00 pm and 9:00 pm on the current day and between 10:00 am and 12:00 pm on the following day. Selection of the option 218 allows the user to select a time window of 8:00 pm to 9:00 pm on the current day for picking up the order. Selection of the option 220 allows the user to select a time window of 10:00 am to 9:00 pm on the following day for picking up the order.

Selection of an option 222 allows the user to save the four refrigerated items for ordering at a different time. For example, the server system can keep track of the items in the user's order. In response to receive a communication from the computing device 102 that the user has selected the option 222, the server system can move the four items in the user's order requiring refrigeration to a saved items list. The items moved to the saved items list are removed from the current order. The user can later access the saved items list by accessing the dedicated application or by accessing the retailer's website using a browser of the computing device 102 or another computing device. The user can then select some or all of the items in the saved items list to include in an order at that later time and place the order for fulfillment at the Edina location (or another location if the user is located closer to another location) at that later time so long as the selected location has available refrigeration capacity in the staging area at that later point in time.

Selection of an option 224 removes the four items requiring refrigeration from the current order without moving the items to a saved items list. For example, the server system can keep track of the items in the user's order. In response to receive a communication from the computing device 102 that the user has selected the option 224, the server system can remove the four items in the user's order requiring refrigeration from the current order.

Selection of an option 226 can cause the order to be switched to delivery fulfillment. For example, the server system 106 can communicate with computing systems located at or associated with one or more fulfillment locations to communicate details of the order to one or more employees of a fulfillment location to prepare the items in the order for delivery. In some implementations, after preparation of the order, an employee of the retailer delivers the order to a location selected by the user. In some implementations, the server system 106 can coordinate with a computing system of a third party delivery service to reserve or hire a delivery driver to deliver the order after the items for the order are prepared by employees of the retailer. In some implementations, the server system 106 selects a fulfillment location for the delivery order based on available refrigeration storage capacity of the location being above a threshold. Other alternate fulfillment options not shown in this example can also be available. For example, fulfillment of the order from multiple locations, as described above, can be provided as an option. As another example, an option for canceling the entire order or moving the entire order to a saved items list can be provided.

The screen 212 includes a user selectable control 228 that, upon selection by the user, submits the alternate fulfillment option selected by the user. For example, selection of the user selectable control 228 can cause the computing device 102 to communicate with server system 106 to indicate the selected alternate fulfillment method to the server system 106. The server system 106 can then communicate with the computing device 102 to allow the user to complete the order (e.g., by adding additional items to the order, submitting the order, submitting payment information, etc.).

In an example implementation, the user of the computing device 102 can select the option 214 to select order fulfillment at the Richfield location. The user can then begin to travel toward the Richfield location and interact with the dedicated application to indicate to the server system 106 that the user has begun to travel toward the selected alternate fulfillment location to pick up the order.

In response to receiving notification that the user has begun to travel toward the selected alternate fulfillment location (e.g., the store 118 of FIG. 1), the server system 106 provides a notification to a computing device of an employee at the alternate fulfillment location to prompt the computing device to provide a notification to the employee that the user is on the way. The notification from the server system 106 communicated to the employee's device can include additional information such as the ETA for the user, an identifier for the user (e.g., name, user id, customer number, etc.), an identifier for the order (e.g., an order number), information on the type of fulfillment for the order (e.g., drive-up fulfillment or in-store pickup fulfillment) and/or other information associated with the order. As discussed above, the server system 106 can communicate directly with the employee's device via the network 104 or, in some implementations, can communicate with a central computer located at the alternate fulfillment location, such as the computing system 116 of store 118, which in turn relays information to the employee's device. For purposes of brevity, further communications will be described as being directly between the server system 106 and the employee's device but should be understood to also to cover communications of information that are relayed to the employee's device through one or more other computing devices from the server system 106.

In response to receiving the notification that the user has begun to travel toward the alternate fulfillment location, the employee's device displays a notification to the employee. The employee's device can also provide audio (e.g., ringing, text to speech) or tactile (e.g., vibration) output to notify the employee that the user is on the way. The employees device can display another notification upon receiving a communication indicating that the user has arrived at or is about to arrive at the alternate fulfillment location. For example, upon the server system 106 determining that the user has arrived at the alternate fulfillment location or receiving a communication from the computing device 102 indicating that the user has arrived at the alternate fulfillment location, the server system 106 sends a communication to the employee's device to cause the employee's device to display a notification to the employee. In some implementations, the notification can include additional information. For example, the notification can include the user's name, vehicle identification information, parking space number/identifier at which the user is parked, an indication of one or more staging locations for the order (e.g., one or more refrigerated and none refrigerated storage units in a staging area containing items for the order), or other information related to the order. In some implementations, the employee can select the notification or an order listing for the user's order from a list of multiple user orders to view additional information about the order. Such information can include staging area storage unit identifiers where items for the order are located. This information can additionally include identifiers and/or descriptions of the individual items in the order, the number of items in each bag for each staging are storage unit, and the total number of bags for the order. The order information can also include information on a drive-up parking spot at which the user has parked, information on the make and model of the user's vehicle, and information on where in the vehicle to place items in the order.

The employee can then gather the items for the order and deliver them to the user's vehicle. Upon placing the items in the user's vehicle, the employee can use their device to scan a computer readable code displayed by the user's computing device 102 to verify that the items have been delivered to the correct customer and complete the delivery process. Alternatively, the dedicated application executing on the computing device 102 can display a unique verification code that the user can show to the employee (e.g., through a vehicle window). The employee can then enter the verification code displayed on the computing device 102 into a text field on the employee's device and select a user selectable control to submit the verification code to confirm the order. Selection of the user selectable control can cause the employee's device to transmit the verification code entered into the text field to the server system 106.

The server system 106 can then check to see that the entered verification code matches the order for the user of the computing device 102. For example, the server system 106 (or the computing system 116 or the employee's device) can compare identifying information (e.g., for the user or the order) associated with the entered verification code to identifying information for the user or the order to verify that the employee is providing the correct order to the user. In some implementations, such a determination is made at a central computer of the alternative fulfillment location in communication with the employee's device or at the server system 106. If the verification code entered at the employee's device matches the verification code displayed by the user's computing device 102 and matches the order being delivered, the server system 106 can send a confirmation to the employee's device which can cause the employee's device to display an updated user interface confirming that the employee is delivering the order to the correct vehicle.

In some implementations, the employee's device also displays the verification code for the order so that the employee can visually inspect the verification code displayed by the computing device 102 and the verification code displayed by the employee's device to ensure that they match.

Figure 3:
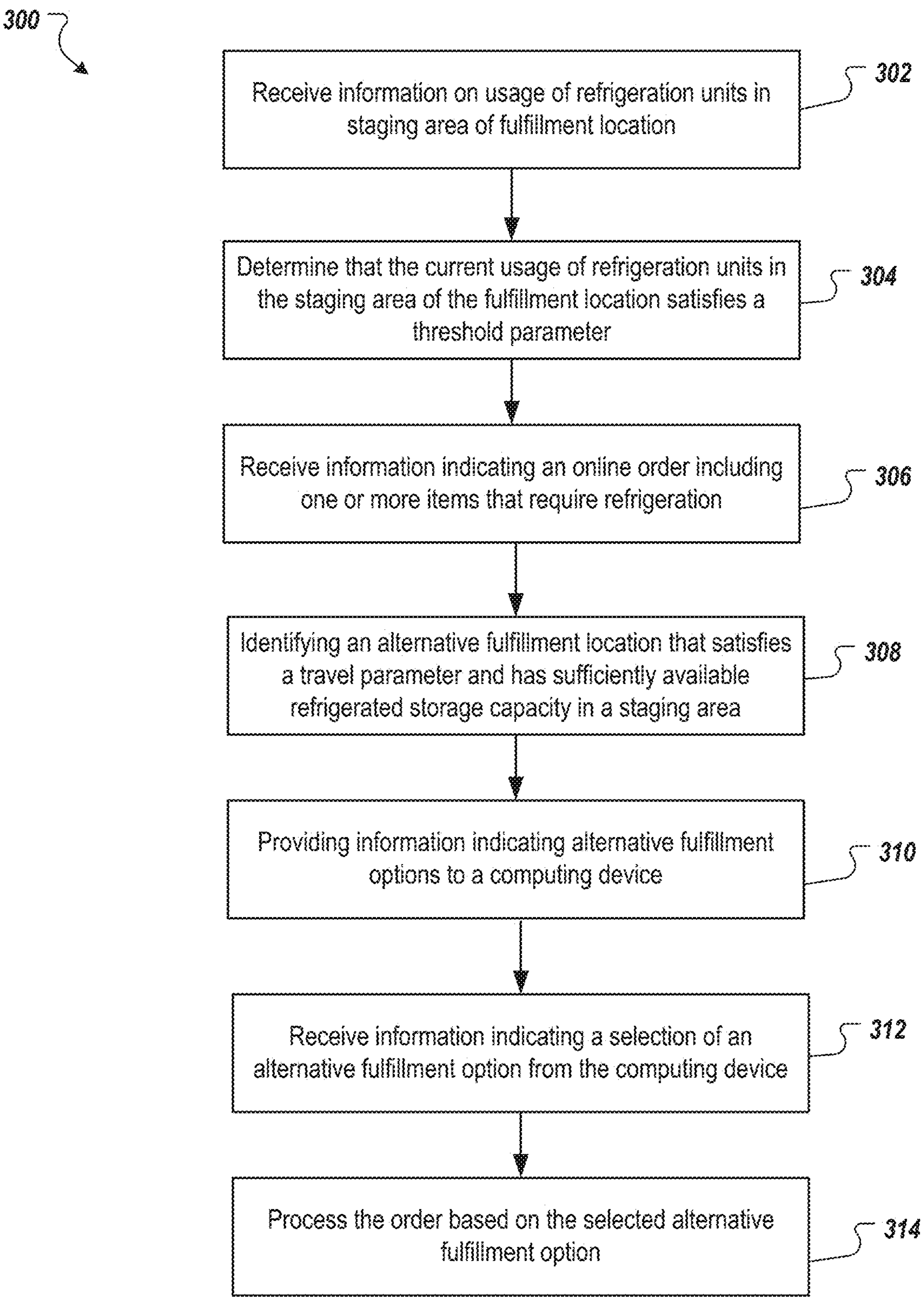
FIG. 3 is a flowchart of an example process to be performed by one or more computing devices in a drive-up or pickup order fulfillment system to facilitate presentation and selection of alternate fulfillment options.

FIG. 3 is a flowchart of an example process 300 to be performed by one or more computing devices in a drive-up or pickup order fulfillment system to facilitate presentation and selection of alternate fulfillment options. For example, the process 300 can be performed by the server system 106 of FIG. 1, the computing system 108 of FIG. 1, the computing system 116 of FIG. 1, or a combination of those computing systems. A computing system receives information on usage of one or more refrigeration units in a staging area of a fulfillment location associated with a retailer (302). For example, the fulfillment location can be a retail store that includes retail items, including grocery items. The grocery items include perishable items that require refrigeration. The information can indicate usage of both refrigeration units and freezer units. The information can include information that indicates or can be used to determine the current amount of capacity that occupied in the refrigeration units or freezer units.

The information can be information that is obtained using one or more sensors, one or more scanning devices, or can be manually entered information. For example, light or weight sensors located in each refrigerated storage unit (e.g., a shelf or drawer within a refrigerator or freezer) can determine if one or more items are located in each respective refrigerated storage unit. As another example, a store employee can use a scanning device to scan a code associated with a storage unit to indicate that the storage unit is occupied or to indicate that items have been removed from the storage unit, thereby changing the status of the storage unit to available. As another example, a store employee can manually enter an identifier for a refrigerated storage unit upon placing one or more items into the storage unit or upon removing items from the storage unit to change the status of the storage unit to occupied or available. A combination of these techniques can also be employed.

The information collected using the one or more sensors, the one or more scanners, or manually entered can be collected at a computing system and then transmitted to the computing system that performs the process 300. The computing system can then calculate a percentage of refrigeration unit space at the staging area of the fulfillment location is occupied.

Next, the process 300 involves the computing system determining that the current usage of refrigeration units in the staging area of the fulfillment location satisfies a threshold parameter (304). For example, the computing system retrieves a predetermined threshold and compares the calculated percentage of refrigeration unit space at the staging area of the fulfillment location that is occupied to the threshold value. If the calculated percentage of refrigeration unit space at the staging area of the fulfillment location that is occupied is equal or greater than the threshold amount, the computing system determines that the threshold parameter has been satisfied.

Next, the computing system receives information indicating an online order including one or more items that require refrigeration. For example, the computing system can receive information from a user device that the user is using a dedicated application associated with the retailer to select items for purchase for an order. The computing system can further receive information indicating that the order is for pickup fulfillment along with information indicating a fulfillment location for the order. The indicated fulfillment location can be, for example, the fulfillment location that has satisfied the threshold parameter at step 304. The computing system can further identify that the order includes one or more items that are perishable and require refrigeration or freezing.

The computing system identifies an alternative fulfillment location that satisfies a travel parameter and has sufficiently available refrigerated storage capacity in a staging area (308). For example, the computing system can retrieve a travel parameter indicating a travel threshold of 20 miles or 35 minutes. The computing system can compare a travel distance or estimated travel time from a location associated with the user (e.g., user's current location, user's home address, user's work address) to an alternative fulfillment location (e.g., another store associated with the retailer) to the retrieved travel parameter to see if the travel distance or estimated travel time is at or below the retrieved travel parameter. In another example, the computing system can compare a travel distance or estimated travel time from the initially selected fulfillment location for the user to a potential alternative fulfillment location (e.g., another store associated with the retailer) to the retrieved travel parameter to see if the travel distance or estimated travel time is at or below the retrieved travel parameter. In another example, the computing system identifies all alternative fulfillment locations (e.g., stores) associated with the retailer within a threshold distance or threshold travel time of the user's location, user's home address, user's work address, or the location of the originally selected fulfillment location.

The computing system then receives information on current refrigeration unit capacity usage for each of the identified locations that are within the threshold travel distance or threshold travel time. The computing system then removes potential alternative fulfillment locations that do not have sufficient refrigeration unit storage capacity available from consideration as an alternative fulfillment location. That is, the computing system selects only alternative fulfillment locations (stores) within the threshold distance or travel time that have sufficient refrigeration unit storage capacity available as viable/available alternative fulfillment locations.

In some implementations, the step 308 of process 300 is performed in response to determining at step 304 that the current usage of refrigeration units in the staging area of the fulfillment location satisfies the threshold parameter and identifying at step 306 that the online order for the user includes one or more items that require refrigeration.

The process 300 includes the computing system providing information indicating alternative fulfillment options to a computing device (310). For example, the computing system can provide information that causes the computing device to display the viable alternative fulfillment locations identified at step 308. The user can select from among the viable alternative fulfillment locations to select an updated fulfillment location for the order. The computing system can further provide the computing device with alternative fulfillment options that include fulfilling the order at the originally selected fulfillment location at a time in the future. The time in the future can be identified using historical data on staging area refrigeration unit capacity usage for the originally selected fulfillment location, including time stamped usage information. The computing system can further provide the computing device with alternative fulfillment options that include moving the refrigerated items in the order to a saved items list, removing the refrigerated items from the order, switching to delivery fulfillment, or cancelling the order. In some implementations, the step 310 includes the computing system providing information to the computing device that causes the computing device to display a user interface screen such as the user interface screen 212 of FIG. 2B.

The process 300 includes the computing system receiving information indicating a selection of an alternative fulfillment option from the computing device (312). For example, the user of the computing device can select one of the alternative fulfillment options and the user's computing device then transmits information indicating the selection to the computing system. For example, the user can select one of the radio buttons provided by the user interface screen of 212 of FIG. 2B and select the user selectable control 228 to cause the user's computing device to transmit information indicating the user's selection to the computing system.

The process 300 includes the computing system processing the order based on the selected alternative fulfillment option (314). For example, if the user opts to fulfill the order at the originally selected fulfillment location at a later time, the computing system can communicate with one or more computing devices associated with the originally selected fulfillment location to convey information for the order (items in the order, identifying information for the user, etc.) along with an indication of the fulfillment time-range selected by the user. The one or more computing devices associated with the originally selected fulfillment location can then convey information on the order to one or more employees of the fulfillment location at or near the fulfillment time-range selected by the user.

As another example, if the user has opted to fulfill the order at a different fulfillment location, the computing system can communicate with one or more computing devices associated with the new fulfillment location to convey information for the order (items in the order, identifying information for the user, etc.). The information on the order is then presented to one or more employees of the new fulfillment location by the one or more computing devices to allow the employees to prepare the order as described above. For example, the employees can be presented with the order information upon the computing system conveying an indication that the user has begun to travel toward the newly selected fulfillment location.

Figure 4:
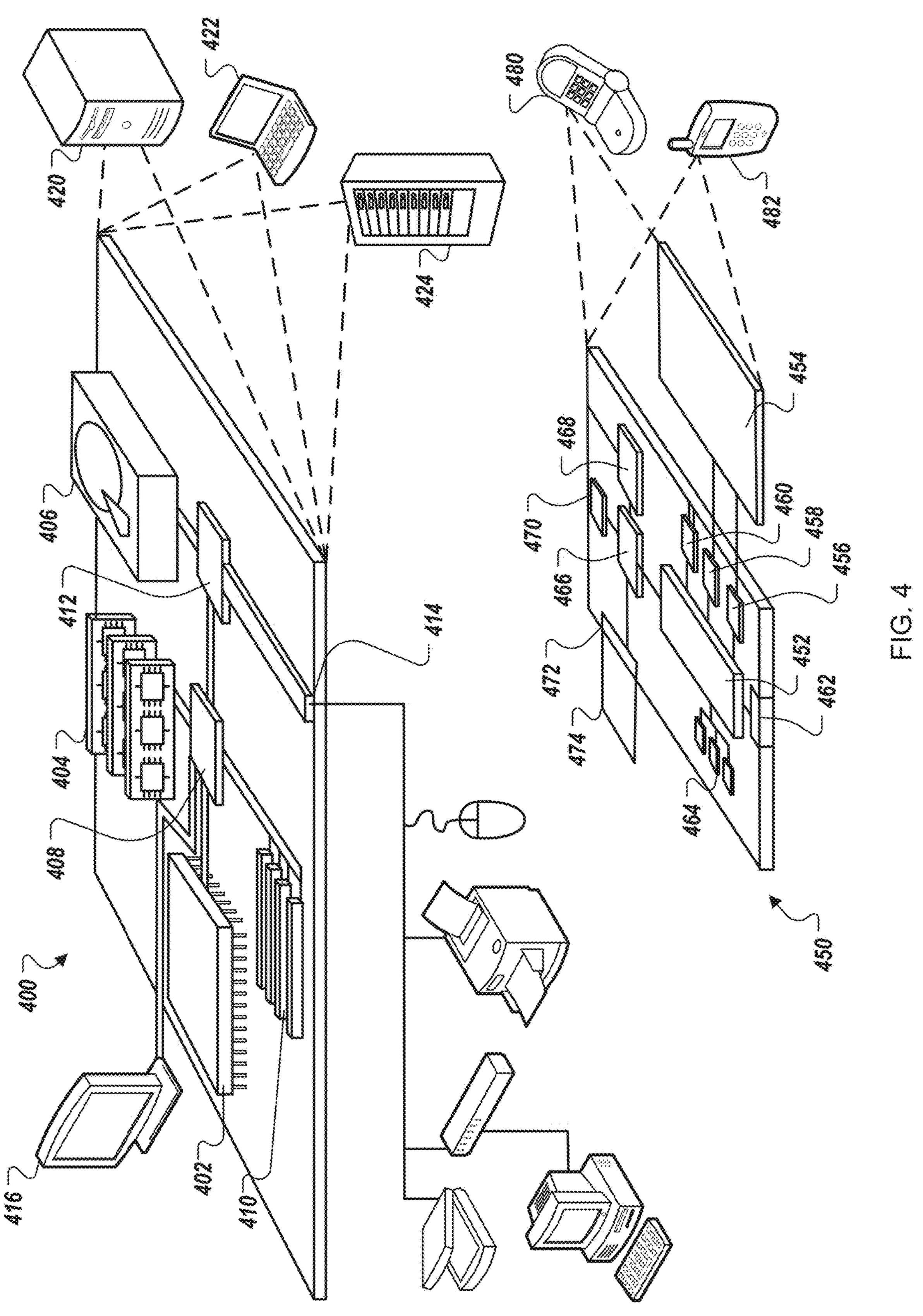
FIG. 4 is a schematic diagram that shows an example of a computing system.

FIG. 4 shows an example of a computing device 400 and an example of a mobile computing device that can be used to implement the techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor and can be implemented in a high-level procedural and/or object-oriented programming language and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer implemented method comprising:

receiving, by a first computing system, information indicating selection of one or more items for inclusion in an online order initiated by a user at a remote computing device;

determining that one or more of the items included in the online order requires refrigeration;

receiving, by the first computing system and from one or more sensors located at a fulfillment location, sensor data indicative of usage of one or more refrigeration units located at the fulfillment location, wherein the sensor data includes a capacity of the one or more refrigeration units, an occupancy level of the one or more refrigeration units, or both, wherein the one or more refrigeration units are located at a staging location for storing perishable items prior to pickup;

identifying, by the first computing system based on the sensor data, a usage value for the one or more refrigeration units located at the fulfillment location;

determining, by the first computing system, that the usage value satisfies a first usage parameter, wherein the first usage parameter corresponds to availability of storage space at the fulfillment location prior to a pickup time associated with the online order;

in response to determining that one or more of the items included in the online order requires refrigeration and determining that the usage value satisfies the first usage parameter, identifying, by the first computing system, one or more potential alternative fulfillment locations that satisfy a travel parameter;

receiving other sensor data indicative of usage of one or more refrigeration units located at each of the one or more potential alternative fulfillment locations;

determining a set of one or more alternative fulfillment locations from the one or more potential alternative fulfillment locations using the other sensor data indicative of usage of the one or more refrigeration units located at each of the one or more potential alternative fulfillment locations to identify that the information indicative of usage of the one or more refrigeration units located at each of the alternative fulfillment locations in the set of alternative fulfillment locations satisfies a second usage parameter corresponding to a capacity level, an occupancy level, or both;

automatically generating, by the computing system, one or more communications that cause a graphical user interface on a remote computing device to automatically update to display one or more alternative fulfillment options, wherein at least one of the one or more alternative fulfillment options includes an indication of at least one of the alternative fulfillment locations in the set of alternative fulfillment locations;

receiving information indicating a selection of one of the one or more alternative fulfillment options; and processing the online order in accordance with the selected one of the one or more alternative fulfillment options.

2. The computer implemented method of claim 1, wherein the sensor data indicative of usage of the one or more refrigeration units located at the fulfillment location comprises an indication of a number of refrigerated storage units in a staging area of the fulfillment location that are occupied.

3. The computer implemented method of claim 2, wherein the number of refrigerated storage units in the staging area of the fulfillment location that are occupied is determined using a plurality of employee operated scanning devices.

4. The computer implemented method of claim 1, wherein the sensor data indicative of usage of the one or more refrigeration units located at the fulfillment location comprises an indication of a percentage of refrigerated storage units in a staging area of the fulfillment location that are occupied.

5. The computer implemented method of claim 1, wherein the sensor data indicative of usage of the one or more refrigeration units located at the fulfillment location comprises a notification that the one or more refrigeration units are at or near capacity.

6. The computer implemented method of claim 1, wherein the one or more alternative fulfillment options includes an option to move the one or more items that require refrigeration in the online order to a saved items list.

7. The computer implemented method of claim 1, further comprising:

using historic usage data for the one or more refrigeration units located at the fulfillment location to identify a time period in the future at which usage of the one or more refrigeration units located at the fulfillment location is likely to be below a third usage parameter;

wherein the one or more alternative fulfillment options includes an option to fulfill the online order at the fulfillment location during the identified time period in the future.

8. A system comprising:

one or more processors;

computer memory containing instructions that, when executed by the one or more processors, cause the system to perform operations comprising:

receiving, by a first computing system, information indicating selection of one or more items for inclusion in an online order initiated by a user at a remote computing device;

determining that one or more of the items included in the online order requires refrigeration;

receiving, by the first computing system and from one or more sensors located at a fulfillment location, sensor data indicative of usage of one or more refrigeration units located at the fulfillment location, wherein the sensor data includes a capacity of the one or more refrigeration units, an occupancy level of the one or more refrigeration units, or both, wherein the one or more refrigeration units are located at a staging location for storing perishable items prior to pickup;

identifying, by the first computing system based on the sensor data, a usage value for the one or more refrigeration units located at the fulfillment location;

determining, by the first computing system, that the usage value satisfies a first usage parameter, wherein the first usage parameter corresponds to availability of storage space at the fulfillment location prior to a pickup time associated with the online order;

in response to determining that one or more of the items included in the online order requires refrigeration and determining that the usage value satisfies the first usage parameter, identifying, by the first computing system, one or more potential alternative fulfillment locations that satisfy a travel parameter;

receiving other sensor data indicative of usage of one or more refrigeration units located at each of the one or more potential alternative fulfillment locations;

determining a set of one or more alternative fulfillment locations from the one or more potential alternative fulfillment locations using the other sensor data indicative of usage of the one or more refrigeration units located at each of the one or more potential alternative fulfillment locations to identify that the information indicative of usage of the one or more refrigeration units located at each of the alternative fulfillment locations in the set of alternative fulfillment locations satisfies a second usage parameter corresponding to a capacity level, an occupancy level, or both;

automatically generating, by the computing system, one or more communications that cause a graphical user interface on a remote computing device to automatically update to display one or more alternative fulfillment options, wherein at least one of the one or more alternative fulfillment options includes an indication of at least one of the alternative fulfillment locations in the set of alternative fulfillment locations;

receiving information indicating a selection of one of the one or more alternative fulfillment options; and processing the online order in accordance with the selected one of the one or more alternative fulfillment options.

9. The system of claim 8, wherein the sensor data indicative of usage of the one or more refrigeration units located at the fulfillment location comprises an indication of a number of refrigerated storage units in a staging area of the fulfillment location that are occupied.

10. The system of claim 9, wherein the number of refrigerated storage units in the staging area of the fulfillment location that are occupied is determined using a plurality of employee operated scanning devices.

11. The system of claim 8, wherein the sensor data indicative of usage of the one or more refrigeration units located at the fulfillment location comprises an indication of a percentage of refrigerated storage units in a staging area of the fulfillment location that are occupied.

12. The system of claim 8, wherein the sensor data indicative of usage of the one or more refrigeration units located at the fulfillment location comprises a notification that the one or more refrigeration units are at or near capacity.

13. The system of claim 8, wherein the one or more alternative fulfillment options includes an option to move the one or more items that require refrigeration in the online order to a saved items list.

14. The system of claim 8, the operations further comprising:

using historic usage data for the one or more refrigeration units located at the fulfillment location to identify a time period in the future at which usage of the one or more refrigeration units located at the fulfillment location is likely to be below a third usage parameter;

wherein the one or more alternative fulfillment options includes an option to fulfill the online order at the fulfillment location during the identified time period in the future.

15. A non-transitory computer-readable medium containing instructions that, when executed by one or more processors, cause the performance of operations comprising:

receiving, by a first computing system, information indicating selection of one or more items for inclusion in an online order initiated by a user at a remote computing device;

determining that one or more of the items included in the online order requires refrigeration;

receiving, by the first computing system and from one or more sensors located at a fulfillment location, sensor data indicative of usage of one or more refrigeration units located at the fulfillment location, wherein the sensor data includes a capacity of the one or more refrigeration units, an occupancy level of the one or more refrigeration units, or both, wherein the one or more refrigeration units are located at a staging location for storing perishable items prior to pickup;

identifying, by the first computing system based on the sensor data, a usage value for the one or more refrigeration units located at the fulfillment location;

determining, by the first computing system, that the usage value satisfies a first usage parameter, wherein the first usage parameter corresponds to availability of storage space at the fulfillment location prior to a pickup time associated with the online order;

in response to determining that one or more of the items included in the online order requires refrigeration and determining that the usage value satisfies the first usage parameter, identifying, by the first computing system, one or more potential alternative fulfillment locations that satisfy a travel parameter;

receiving other sensor data indicative of usage of one or more refrigeration units located at each of the one or more potential alternative fulfillment locations;

determining a set of one or more alternative fulfillment locations from the one or more potential alternative fulfillment locations using the other sensor data indicative of usage of the one or more refrigeration units located at each of the one or more potential alternative fulfillment locations to identify that the information indicative of usage of the one or more refrigeration units located at each of the alternative fulfillment locations in the set of alternative fulfillment locations satisfies a second usage parameter corresponding to a capacity level, an occupancy level, or both;

automatically generating, by the computing system, one or more communications that cause a graphical user interface on a remote computing device to automatically update to display one or more alternative fulfillment options, wherein at least one of the one or more alternative fulfillment options includes an indication of at least one of the alternative fulfillment locations in the set of alternative fulfillment locations;

receiving information indicating a selection of one of the one or more alternative fulfillment options; and processing the online order in accordance with the selected one of the one or more alternative fulfillment options.

16. The computer-readable medium of claim 15, wherein the sensor data indicative of usage of the one or more refrigeration units located at the fulfillment location comprises an indication of a number of refrigerated storage units in a staging area of the fulfillment location that are occupied.

17. The computer-readable medium of claim 16, wherein the number of refrigerated storage units in the staging area of the fulfillment location that are occupied is determined using a plurality of employee operated scanning devices.

18. The computer-readable medium of claim 15, wherein the sensor data indicative of usage of the one or more refrigeration units located at the fulfillment location comprises an indication of a percentage of refrigerated storage units in a staging area of the fulfillment location that are occupied.

19. The computer-readable medium of claim 15, wherein the sensor data indicative of usage of the one or more refrigeration units located at the fulfillment location comprises a notification that the one or more refrigeration units are at or near capacity.

* * * * *